July 22, 1969 W. J. BIEBER 3,456,522
SHIFTING MECHANISM FOR TRANSMISSIONS
Filed Dec. 5, 1967 2 Sheets-Sheet 1
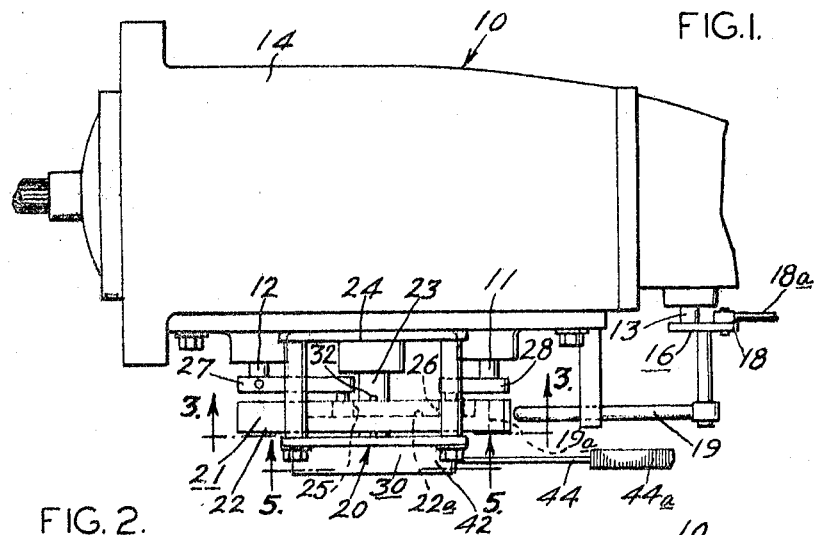
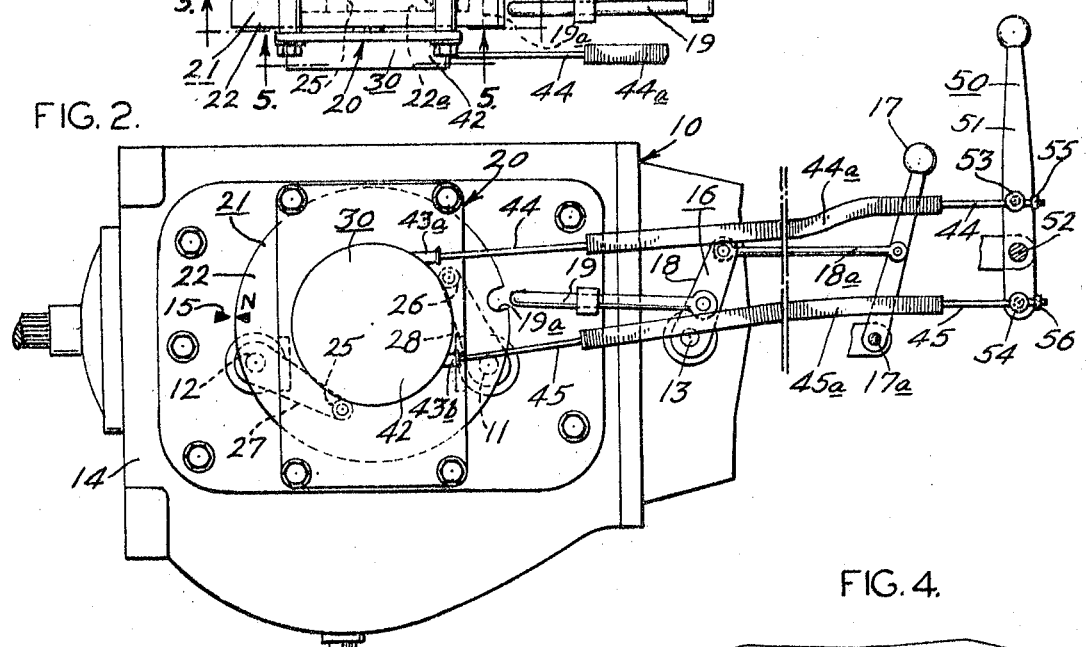
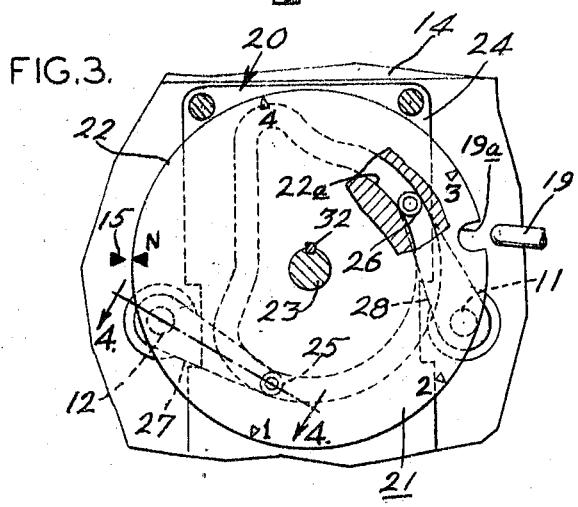
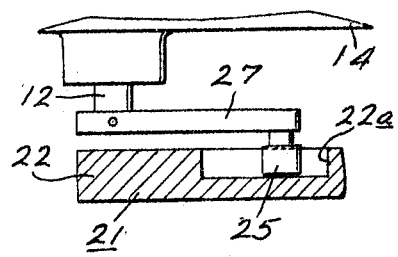
INVENTOR:
WILLIAM J. BIEBER
BY Howson & Howson
ATTYS.

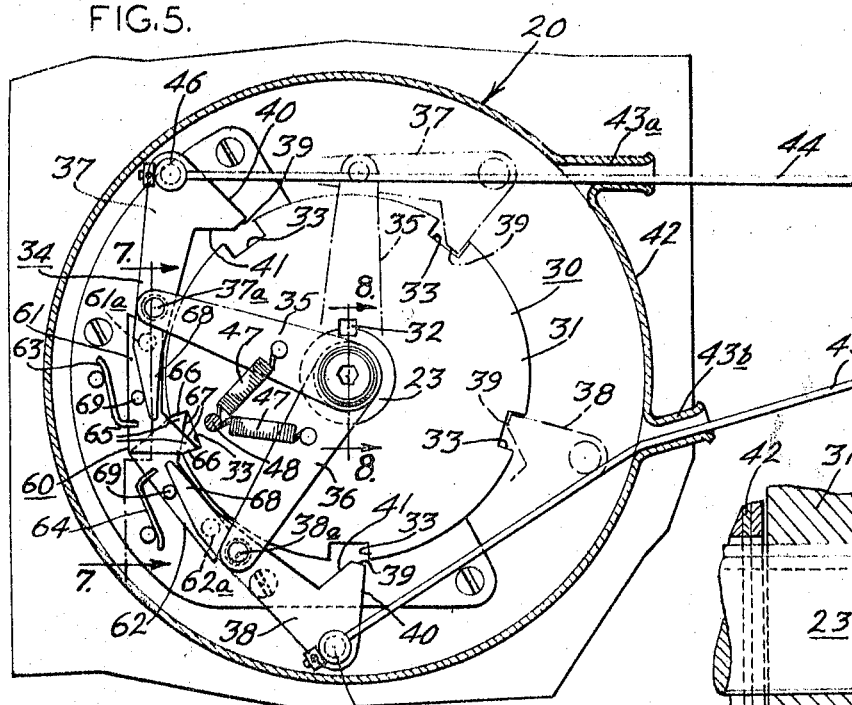
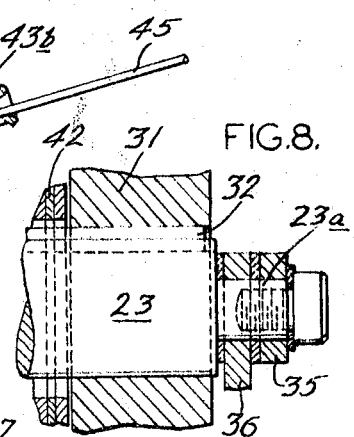
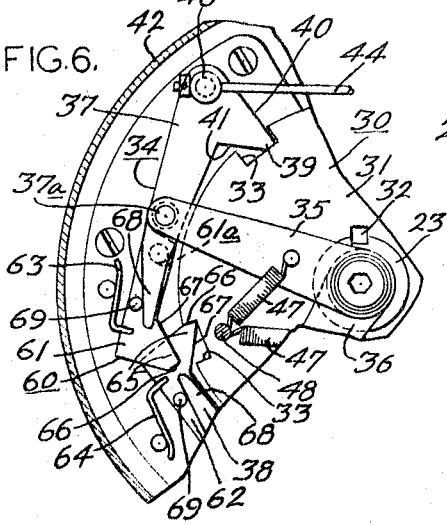
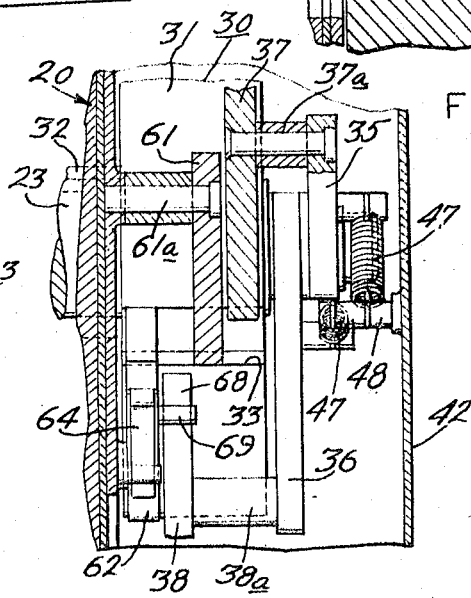
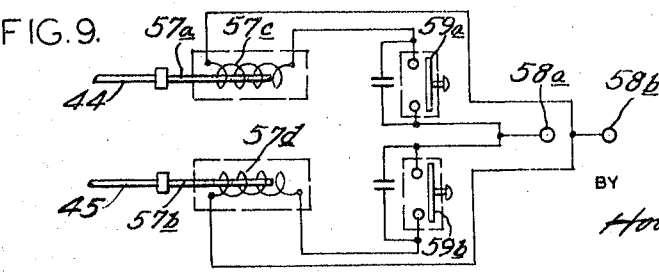
INVENTOR:
WILLIAM J. BIEBER
BY Howson & Howson
ATTYS.

United States Patent Office 3,456,522
Patented July 22, 1969

3,456,522
SHIFTING MECHANISM FOR TRANSMISSIONS
William J. Bieber, Cottageville Road, R.D. 2,
Doylestown, Pa. 18901
Filed Dec. 5, 1967, Ser. No. 688,174
Int. Cl. G05g 13/00, 9/08, 9/00
U.S. Cl. 74—475     12 Claims

ABSTRACT OF THE DISCLOSURE

Shifting apparatus particularly adapted for shifting gears in manual shift automotive transmissions, the shifting apparatus including a cam which is rotatably mounted with respect to the transmission and which is engageable by cam followers connected to the shift levers or shift yokes of the transmission. Associated with the cam, in order to effect selective clockwise or counterclockwise rotation thereto, is double pawl and ratchet means, the ratchet means being connected to the cam to effect rotation thereof relative to the transmission. Connected to the pawl is a shifting device for actuation of one or the other of the pawls whereby rotation of the cam means and thus up or down shifting of the gears is effected.

Summary of the invention

The present invention relates to gear shifting apparatus for transmissions, and more particularly relates to gear shifting apparatus adapted for use in automotive type vehicles having manual shift transmissions.

Automotive transmissions may be broadly classified in one of two groups, automatic or manual shift transmissions. The rise of sports car enthusiasts in this country and abroad has brought back into vogue the manual shift transmission, especially of the four forward gear type. Almost universally the gear shifting arrangement is in the H pattern system requiring, even in short throw shifting, crossing over of the shift lever in order to upshift from second to third gear or in down-shifting from third to second. In numerous instances race car drivers have accidentally crossed over the shift lever gate in the H pattern system and instead of shifting down from fourth to third gear, in order to provide better control of the vehicle during a high speed turn, have shifted to first gear. Unintentional engagement of first gear at high speeds has not only resulted in destroying engines due to the rapid acceleration of the engine but has resulted in throwing the vehicle out of control, causing in some instances loss of life.

In addition, especially with short throw "stick shift" shifting arrangements, a fast up-shift or down-shift sometimes permits partial engagement of both gear sets associated with the previous and subsequent gear. Also, experience has shown that in many instances after down-shifting to help control the vehicle during de-acceleration, the shift lever will disengage from the down-shifted gear creating operator control problems.

In view of the above it is a principal object of the present invention to provide novel gear shifting apparatus especially adapted for manual shift transmissions, which apparatus provides for positive shifting and engagement of gears.

Another object of the present invention is to provide gear shifting apparatus in which it is virtually impossible to down-shift or up-shift and bypass one or more gears in the transmission without the action being deliberate.

Another object of the present invention is to provide novel shifting apparatus for transmissions in which positive engagement of the gears is assured eliminating the problem of gear dropout encountered in controlled, de-acceleration down-shifts.

Still another object of the present invention is to provide shifting apparatus which may be manually or automatically operated and which will permit of more rapid and positive shifts than existing manual shift systems.

Other objects and a fuller understanding of the invention may be had by referring to the following specification and claims taken in conjunction with the accompanying drawings in which:

FIG. 1 is a fragmentary plan view of a typical four-speed transmission illustrating the novel shift apparatus of the present invention;

FIG. 2 is a fragmentary side elevational view of the apparatus illustrated in FIG. 1 and showing one means of operating the shift apparatus;

FIG. 3 is an enlarged fragmentary sectional view taken along line 3—3 of FIG. 1;

FIG. 4 is a fragmentary sectional view taken along line 4—4 of FIG. 3;

FIG. 5 is an enlarged fragmentary sectional view taken along line 5—5 of FIG. 1;

FIG. 6 is a fragmentary section of a portion of the apparatus shown in FIG. 5, with the portion shown in a different position;

FIG. 7 is a fragmentary sectional view taken along line 7—7 of FIG. 5;

FIG. 8 is an enlarged fragmentary sectional view taken along line 8—8 of FIG. 5; and FIG. 9 is another embodiment illustrating different apparatus from that shown in FIG. 2 for effecting the shifting of gears.

Referring now to the drawings, and especially FIG. 1 thereof, a typical four-speed transmission 10, for example a Borg Warner Model T-10 used in General Motors automobiles, is shown therein. Typically, projecting from the housing 14 of the transmission 10 are shift levers, yokes or shafts 11, 12 and 13, the shift lever 11 being actuated, in a conventional shift transmission, for moving the gears from neutral to first gear (low) and from first to second gear; shift lever 12 being actuated for shifting the gears from second to third and third to fourth. The shift lever 13 on the other hand, is utilized to engage reverse gear.

In accordance with the invention novel shift apparatus 20 is operatively connected to the shift levers 11 and 12 of the transmission 10 so that upon movement of gear shifting means 50 the gears may be moved successively to effect changes in the gear ratio between the engine and the rear end of the motor vehicle. To this end, the shift apparatus 20 includes cam means 21, in the present instance comprising a disc 22 mounted on a shaft 23 which is rotatably supported on the housing of the transmission 10 by any convenient means such as a mounting base 24 bolted to the housing 14. As shown in FIG. 3, the rearward side (the side facing the transmission housing 14) of the disc 22 includes a cam slot 22a in which rollers 25 and 26 connected to cam follower arms 27 and 28 ride. As shown in FIGS. 1 and 3, the cam follower arm 27 is secured to the shift lever 12 while the cam follower arm 28 is connected to the shift lever 11. As the disc 22 is rotated the shift levers 11 and 12 are selectively turned effecting changes in the gear ratio due to their radial movement with respect to the shaft 23.

To facilitate understanding of the corresponding positions of the cam follower arms 27 and 28 in shifting through the four forward gears, the disc has been marked with arrows circumferentially spaced and designated N (for neutral) and 1-4 respectively, indicating, as the arrow aligns with a pointer 15 on the housing, the various shift positions. Assuming that the disc rotates clockwise, moving the disc until the pointer 15 aligns with the arrow 1 will shift the transmission to first gear. As may be seen, rotation of the disc clockwise affords no radial movement in the cam follower arm 27 while the cam follower arm 28 is moved clockwise. Indexing the disc 22 until the arrow 2 aligns with the pointer 15 causes rotation of the cam follower arm 28 counterclockwise through neutral into second gear, the cam follower arm 27 still retaining its neutral position as the arc of the cam slot 24 from pointer alignment N through 2 is an equal radial distance from the center of the shaft 23. However, as the disc indexes so that the pointer 15 aligns between arrows 2 and 3, cam follower arm 28 moves clockwise to neutral, after which cam follower arm 27 commences clockwise rotation and arrives at a third gear position when the arrow 3 aligns with the pointer 15. Indexing the disc 22 in a clockwise manner between arrows 3 and 4 causes counterclockwise rotation of the cam follower arm 27 through neutral to fourth gear while arm 28 stays in a neutral position. In a like manner, continued indexing to bring the arrow N into alignment with the pointer 15 causes arm 27 to move clockwise to the neutral position while follower arm 28 stays in the neutral position. It is obvious, from the foregoing, that rotation of the disc in a counterclockwise direction about the shaft 23 will effect down-shifting, the various rotational movements of the cam follower arms being reversed from that set forth above.

In order to permit consecutive selective shifting of the gears so as to prevent unintentional engagement of the wrong gear, indexing mechanism 30, operatively connected to the cam means 21, permits shifting of the gears in consecutive order. To this end, the indexing mechanism 30 comprises a ratchet 31 connected to the disc 22, in the illustrated instance by a key 32 on the shaft 23 (see FIG. 8). Circumferentially spaced above the periphery of the ratchet 31 is a plurality of recesses or slots 33 corresponding in number to the neutral and first through fourth gear positions on the disc 22.

In order to effect up-shifting and down-shifting, as desired, the indexing mechanism 30 also includes pawl means 34 adapted to engage the ratchet 31 and effect rotation thereof. To this end, and as best shown in FIG. 5, rotatably mounted on an extension 23a of the shaft 23 is a pair of radially extending arms 35 and 36 having pawls 37 and 38 pivotally mounted at 37a and 38a respectively at the extended terminus of the arms, the pawls being positioned so as to overlie the peripheral edge of the ratchet 31. As may be seen in FIGS. 5 and 6, each of the pawls 37 and 38 includes an inwardly projecting nose 39 having a substantially radially extending leading edge 40 and a rearwardly sloped trailing edge 41, the nose 39 on the pawl 37 being arranged so that upon engagement with a slot 33 and movement of the pawl, the ratchet 31 will move clockwise, while engagement of the nose 39 on the pawl 38 in a slot 33 will cause counterclockwise rotation of the ratchet 31.

As shown, in order to reduce dirt and the like in the indexing mechanism, a cover or case 42 is provided having chute-like openings 43a and 43b therein to permit control cables 44 and 45 to pass therethrough and connect respectively to the pawls 37 and 38 as through a pivotable bushing 46. To facilitate retraction of the pawls, each of the arms 35 and 36 is provided with a biasing means, in the illustrated instance a spring 47, the spring being connected, as shown in FIG. 7 to the case by a lug 48 projecting inwardly therefrom. As each of the pawls 37 and 38 are pivotably connected to the arms 35 and 36, tension applied to the cable 44 will effect clockwise rotation of the pawl 37 about the pivot 37a and engagement of the nose 39 in a slot 33, increased tension causing the ratchet 31 and thus the disc 22 to rotate relative to the transmission. Of course, in a like manner tension on the cable 45 permits the nose 39 of the pawl 38 to engage in a slot 33 and cause counterclockwise rotation of the ratchet, in either instance the non-working pawl, because of its sloped trailing edge 41, will cam away from the ratchet causing disengagement thereof.

As is desirable to insure positive insertion and locking of the ratchet as the gears are changed or shifted, separate latch means 60 is provided for cooperation with each of the pawls 37 and 38 so that upon tension being placed on either one of the cables 44, 45, the maximum rotation of the ratchet 31 and thus the cam disc 22 is one gear change, i.e., in the illustrated instance ⅕ of the circumferential distance about the periphery of the ratchet 31. To this end, and as may best be seen in FIGS. 5 and 6, a pair of latches 61 and 62 are provided for cooperation and engagement in a slot 33 of the ratchet 31. As shown, each of the latches is pivoted as at 61a, 62a, to the case 42, the latches normally being urged towards the ratchet 31 by springs 63 and 64. Each of the latches 61 and 62 have a radially and inwardly extending nose 65 including a radial leading edge 66 and rearwardly sloped trailing edge 67, the trailing edge insuring that the latch 61, will disengage or be cammed out of a slot 33 upon counterclockwise rotation of the ratchet, the trailing edge 67 associated with the latch 62 insuring that the latch will be cammed outwardly upon clockwise rotation of the ratchet.

In order to disengage the latches upon tension being applied to either of the cable means 44 and 45, each of the pawls 37 and 38 have a tail portion 68 which is normally positioned, as shown in FIG. 5, so as to underlie a projecting lug 69 connected to the latch. In this manner, and as best shown in FIG. 6, using pawl 37 as an example, upon tension being applied to the cable 44, the pawl 37 tends to rotate about its pivot 37a, the tail 68 of the pawl engaging the lug 69 and lifting the latch 61, in a clockwise direction about its pivot 61a, from the slot 33 and thus permitting rotation of the ratchet because latch 62 is cammed upwardly by its trailing edge 67. As the latches are so connected as to permit relative rotation of the ratchet with respect thereto, the pawl 37 and its associated arm 35 will move in a clockwise direction, the tail 68 of the pawl disengaging the lug 69 and the latches will be urged by their springs 63 and 64 against the unslotted periphery of the ratchet. As the pawl, in the example pawl 37, has engaged in a slot 33, rotation will continue until the latches 61 and 62 once again engage in the next adjacent slot 33, and further rotation of the ratchet 31 is prevented. Releasing tension on the cable 44 permits the pawl to retract, due to the spring 47 on the arm 35 until the tail 68 of the pawl engages beneath the lug 69 on the latch. In this manner, the gears may be successively changed, it being obvious that the cable means 44 which causes clockwise rotation of the ratchet 31 and thus the cam means 21 will effect up-shifting, while tension on the cable means 45 will cause counterclockwise rotation of the ratchet 31 effecting down-shifting.

The gear shifting means 50 may take any number of forms in order to effect up or down-shifting on the transmission gears. A typical floor shift arrangement is shown in FIG. 2 wherein the cables 44 and 45 are connected to a shifting lever 51, such as a floor gear shift lever and pivoted as at pivot 52 so that the shift lever 51 may be moved forward or backward to effect respectively downshifting or up-shifting. As shown in FIG. 2, the cable 44 extends through a covering sleeve 44a while the cable 45 extends through a covering sleeve 45a, each of the cables passing through a bushing 53 and 54 respectively and having a nut or like clamp 55 and 56 at the terminal ends thereof. The cables are not clamped in the bushings but are slidingly engaged therein so that if the shift lever is moved rearwardly, i.e. in a clockwise rotation about the pivot 52, the bushing 53 engages the nut or clamp 55 putting tension on the cable 44 and effecting engagement of the pawl 37 in the ratchet means 31. As the bushing 54 loosely receives the cable 45, clockwise rotation of the lever 51 about the pivot 52 permits the cable to ride loosely through the bushing. In a like manner, moving the shift lever 51 in a counterclockwise direction about its pivot 52 causes the bushing 54 to engage the clamp 56 effecting tension on the cable 45 and thus permitting engagement of the pawl 38 into a slot 33 on the ratchet 31. In this instance, the cable 44 will ride loosely in the bushing 53 and no tension will be placed upon that cable.

Of course other shifting means may be utilized, for example in FIG. 9 the cable 44 and 45 may be connected to separate plungers 57a and 57b of electro-magnetic transducers 57c and 57d, in the present instance solenoids. A power source such as the 12-volt battery ignition system may be connected at the terminals 58a and 58b, the respective electro-magnetic transducer means 57c and 57d being capable of actuation by normally open, momentary contact switches 59a and 59b. When it is desired to up-shift, switch 59a is depressed actuating the electro-magnetic transducer 57c causing the plunger 57a to move into the core tensioning the cable 44 causing clockwise rotation of the cam means 21. Every time the switch 59a is depressed and released, one gear change is effected. In a like manner, depressing switch 59b tensions the cable 45 and effects down-shifting by rotating the cam means 21 in a counterclockwise direction.

With shifting apparatus of the present invention, it is necessary to provide an auxiliary lever to effect shifting into reverse gear, the present arrangement, as described hereinafter making it virtually impossible to accidentally shift into reverse gear unless the gears are in neutral. As best shown in FIG. 2, the shifting lever 13 is connected via linkage 16 to an auxiliary shift lever 17 pivoted at 17a. As shown, the linkage 16 includes an arm 18 connected to the shift lever 13 at one end thereof and to a rod 18a connected to the arm 18 and to the shift lever 17. A rod 19 connected to the arm 18 extends, in its normal position, to a point adjacent the periphery of the disc 22, the disc having a peripheral recess 19a therein which aligns with the tip of the rod 19 only when the forward gears are in neutral. Thus if engagement of reverse gear is attempted with the pointer in a position other than with the neutral pointer in alignment with the pointer 15, the tip of the rod 19 will strike the periphery of the disc making engagement of the reverse gear impossible.

Indication of the gear engaged by the operator with the apparatus of the present invention may be displayed in the driver's compartment by any number of means, for example a speedometer cable may be connected to the shaft 23 with appropriate pointer indicia similar to that hereinabove described on the dash, the rotation of the disc 22 and thus the shaft 23 giving an appropritate indication on the dash of the gear position. In addition, a neutral through fourth gear counter may be operated in much the same manner through a counter located on the dash and connected through flexible cable to the shaft 23.

It should be recognized that with slight modification the apparatus of the present invention may be utilized on other transmissions and transmission types, for example with suitable modification the twin shift levers of a hydramatic transmission may be connected, as above, to cam followers for riding in the cam slot of the cam means. This would give the driver control of not only up-shifting or down-shifting but would permit him to make an option as to whether he wished automatic drive or manual shift.

Thus the gear shifting apparatus of the present invention provides for positive shifting and engagement of gears virtually eliminating the possibility of either partial gear engagement under fast shift conditions, or unintentional bypassing of gears when down-shifting and up-shifting.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention.

What is claimed is:

1. Shifting apparatus for a transmission having at least a pair of shift levers for changing the gear ratio of said transmission; said shifting apparatus including cam means and means for rotatably mounting said cam means relative to said transmission; at least a pair of cam follower means for connection to respective shift levers and engagement with said cam means; ratchet means associated with said cam means; pawl means mounted for relative movement with respect to said transmission and for engagement with said ratchet means; and gear shifting means connected to said pawl means for effecting movement to said pawl means and engagement of said ratchet means with said pawl means whereby rotation of said cam means is effected causing shifting of gears.

2. Shifting apparatus in accordance with claim 1 including latch means fixedly mounted relative to said ratchet means and normally engagable with said ratchet means; means on said latch means engagable with said pawl means whereby, upon actuation of said gear shifting means, said pawl means operates to disengage said latch means from said ratchet permitting rotation of said cam means.

3. Shifting apparatus in accordance with claim 1 wherein said cam means comprises a disc having a cam slot thereon, each of said cam follower means including an arm having means thereon for engagement in said cam slot.

4. Shifting apparatus in accordance with claim 3 wherein said ratchet means includes a plurality of slots in the periphery thereof for engagement by said pawl means, and said means for rotatably mounting said disc includes a shaft.

5. Shifting apparatus in accordance with claim 4 said arm rotatably mounted on said shaft, said pawl means pivotally connected to said arm and overlying said periphery of said ratchet means, said arm having biasing means connected thereto and cable means connecting said pawl to said gear shifting means whereby, upon actuation of said gear shifting means, said pawl engages in one of said slots and effects rotation to said ratchet and said cam means.

6. Shifting apparatus in accordance with claim 1 including second pawl means and means for connecting said second pawl means to said gear shifting means whereby engagement of said second pawl means in said ratchet and movement of said second pawl means by said gear shifting means effects rotation of said cam means in a direction opposite to that effected by said first-mentioned pawl means.

7. Shifting apparatus in accordance with claim 6 including first and second latch means fixedly mounted relative to said ratchet means and normally engagable with said ratchet means; means on said first and second latch means engagable with said pawl means and said second pawl means respectively, whereby, upon actuation of said gear shifting means, said actuated pawl means operates to disengage said latch means from said ratchet permitting rotation of said cam means.

8. Shifting apparatus in accordance with claim 7 wherein said ratchet means includes a plurality of circumferentially spaced, peripheral slots, said slots being dimensioned to receive said latches, and biasing means urging said latches into said slots, said actuated pawl means which operates to disengage said latch means from a slot, disengages from said latch upon movement of said ratchet until said latch engages in an adjacent slot thereby limiting the rotation of said cam to effect a single gear change.

9. Shifting apparatus in accordance with claim 1 wherein said gear shifting means includes at least one cable means connected to said pawl means, a pivoted shifting lever connected to said cable means whereby tension on said cable by movement of said lever causes engagement of said pawl with said ratchet effecting rotation of said cam means.

10. Shifting apparatus in accordance with claim 1 wherein said gear shifting means includes at least one cable means connected to said pawl means, an electro-magnetic transducer connected to said cable means and switch means for connecting a source of E.M.F. to said transducer whereby tensioning of said cable means is effected.

11. Shifting apparatus in accordance wit hclaim 6 wherein said gear shifting means includes a pair of cable means each being connected to individual pawl means, a pivoted shifting lever slidingly connected to said cable means, said pivot of said shift lever positioned intermediate points of connection of said cables, and means positioned on said cables whereby movement of said lever about said pivot causes engagement of said pawl with said ratchet effecting rotation of said cam means in one direction, and movement of said lever in an opposite direction causes engagement of said second pawl means with said ratchet effecting rotation of said cam means in an opposite direction.

12. Shifting apparatus in accordance with claim 6 wherein said gear shifting means includes at least a pair of cable means each connected to a pawl means, a pair of electro-magnetic transducers, one of said transducers connected to one of said cable means, and the other of said transducers connected to the other of said cable means, separate switch means interconnecting a source of power to each of said transducers whereby, upon actuation of said transducers by said switch means, tension is applied to said cables to effect rotation of said cam means.

References Cited
UNITED STATES PATENTS

| | | | |
|---|---|---|---|
| 2,772,652 | 12/1956 | Du Shane et al. | 74—337.5 |
| 2,839,941 | 6/1958 | Rugen | 74—337.5 X |
| 2,956,444 | 10/1960 | Bensinger et al. | 74—337.5 X |

MILTON KAUFMAN, Primary Examiner

U.S. Cl. X.R.

74—337.5, 476